April 9, 1946.  R. V. KLEINSCHMIDT  2,398,184
APPARATUS FOR DISTILLATION
Filed June 28, 1941  4 Sheets-Sheet 4
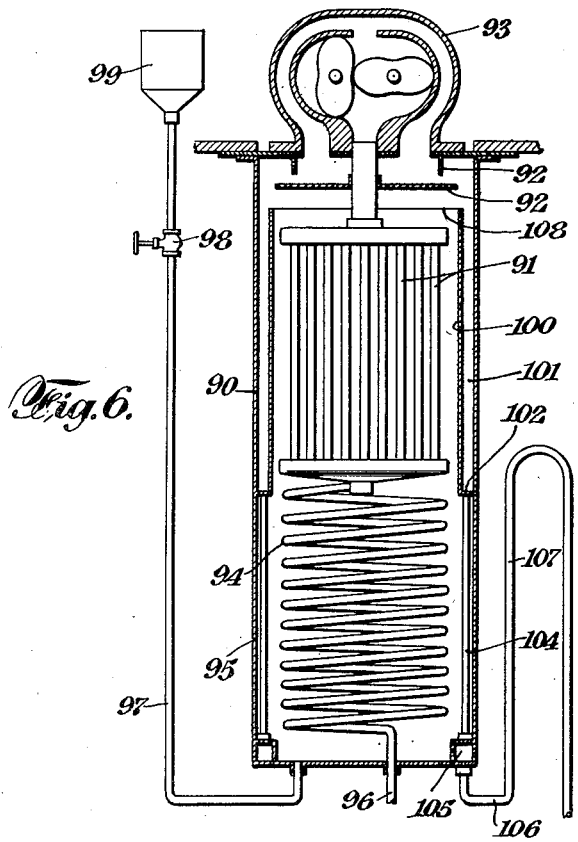
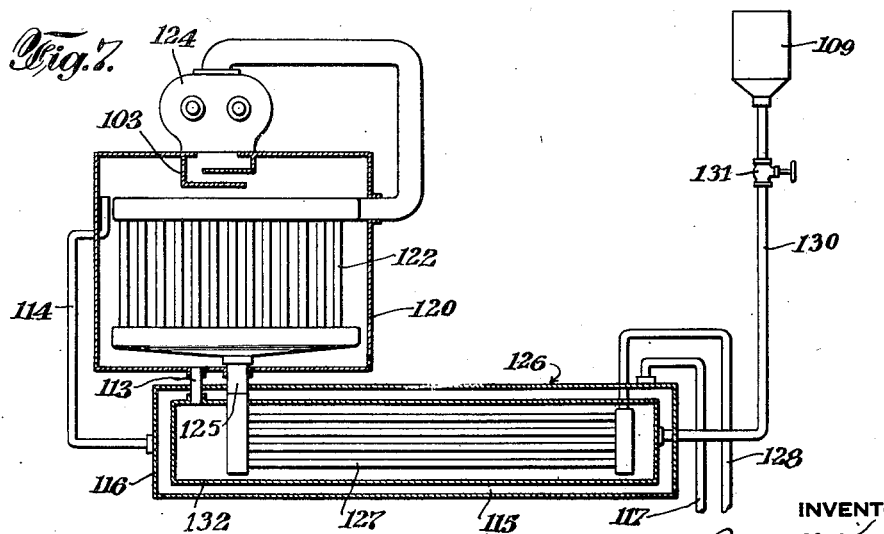
INVENTOR
Robert V. Kleinschmidt
BY Kenyon & Kenyon
ATTORNEYS Patented Apr. 9, 1946

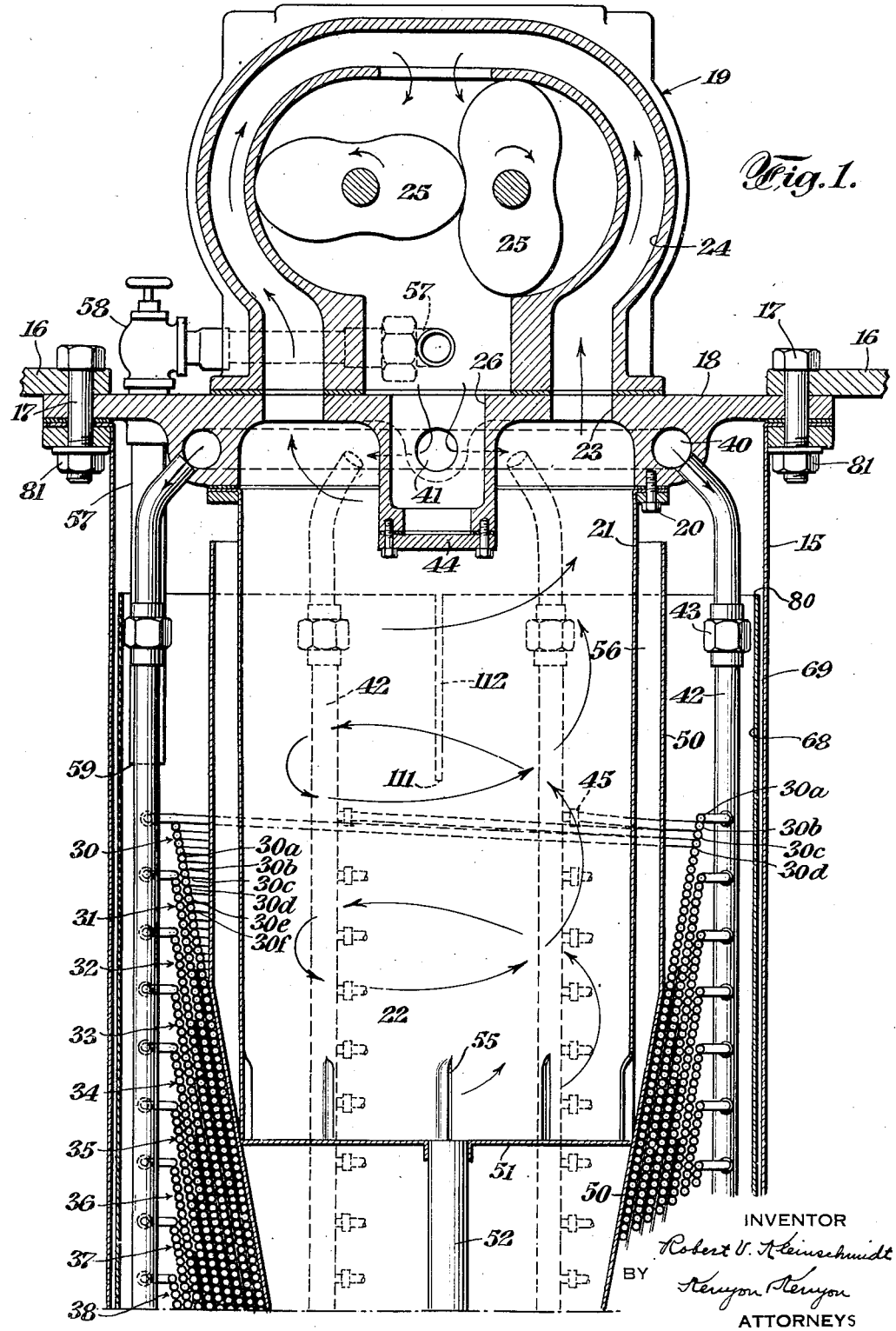

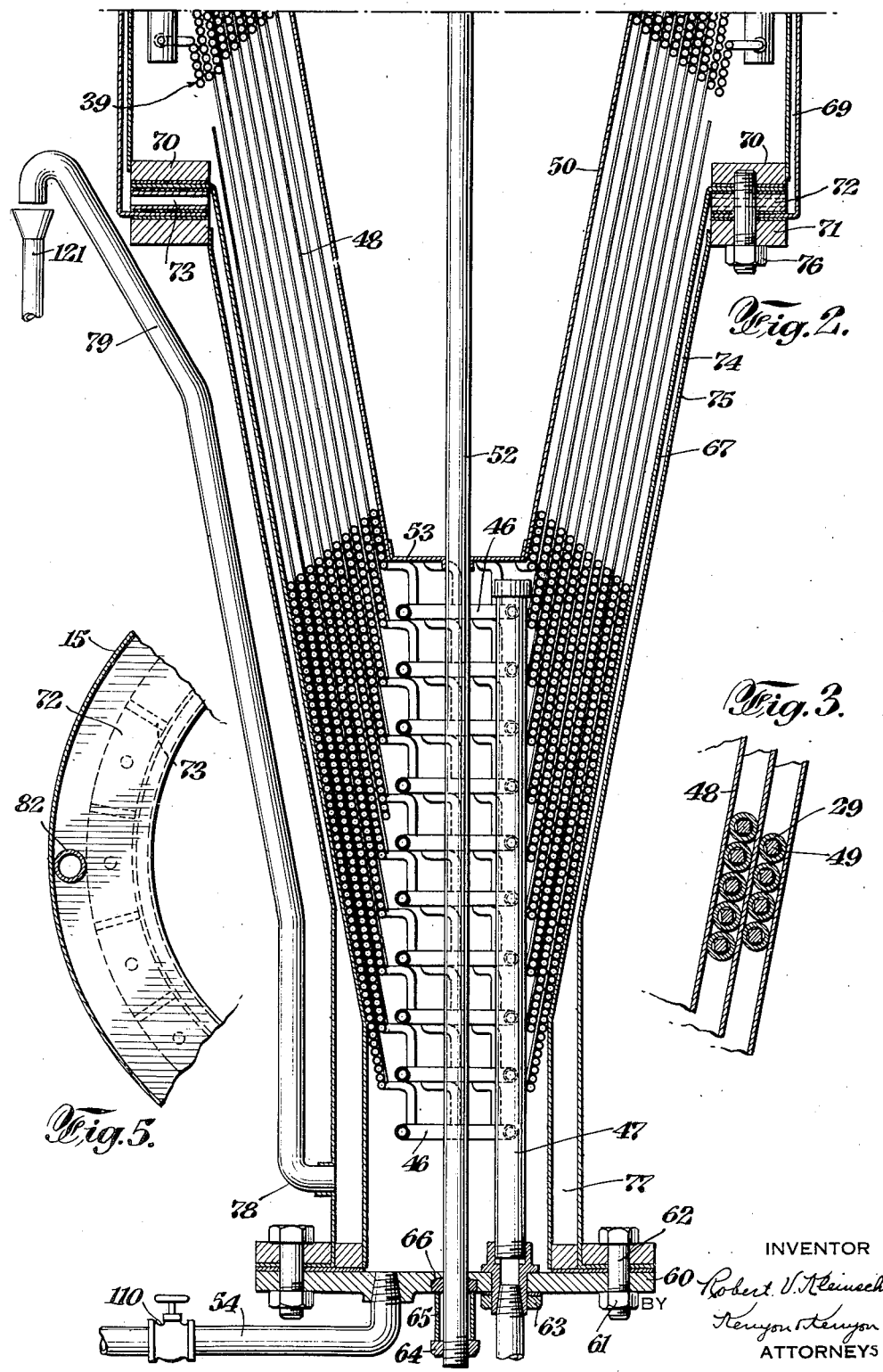

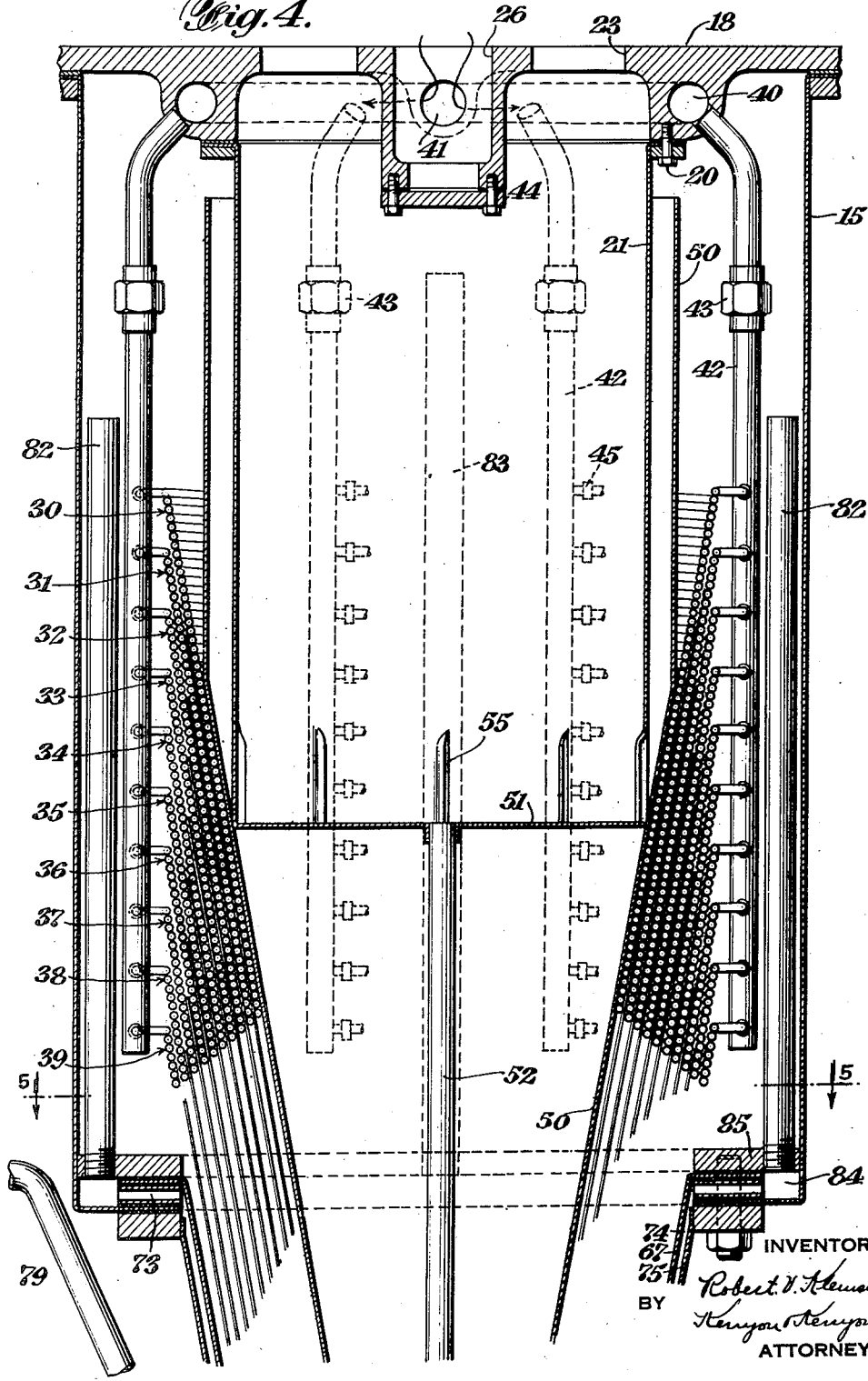

2,398,184

UNITED STATES PATENT OFFICE 2,398,184

APPARATUS FOR DISTILLATION

Robert V. Kleinschmidt, Stoneham, Mass., assignor to Arthur D. Little, Inc., Cambridge, Mass., a corporation of Massachusetts Application June 28, 1941, Serial No. 400,355

17 Claims. (Cl. 202—75)

This invention relates to distillation and heat exchange apparatus. My apparatus is applicable to the handling of fluids and is especially applicable to separating components of a fluid mixture of two or more substances by reason of their difference in boiling point or volatility, in those cases where the initial mixture and the saparated components are liquid during some portion of the operation, but these liquids may be more or less concentrated solutions of solids, liquids or gases in liquids or liquid mixtures of materials normally in solid or gaseous form in the pure state. Any such liquid mixture is referred to herein as a solution. The term "distillation" includes operations which are sometimes referred to as fractionation, rectification, evaporation, concentration, etc., which are characterized by the evaporation of a portion of a liquid mixture.

It is a purpose of this invention to provide distillation apparatus which not only has high efficiency in utilization of energy supplied thereto but also is economical to manufacture and may be readily assembled and disassembled for cleaning.

In my Patents Nos. 2,185,595 and 2,185,596, I have shown and described distillation apparatus of the type wherein a vapor is removed from a vaporization chamber, compressed to a pressure at which the condensing temperature is above the boiling point of the solution being vaporized in the vaporization chamber, and brought into out-of-contact heat exchange relation with solution in the chamber. A solution is fed into the vaporization chamber and the concentrated solution which remains after the vapor is taken off is withdrawn from the system. In my said patents, I have shown and described a central tube that goes down through the center of the vaporization chamber and down through the center of a preheater chamber in which solution entering the vaporization chamber is preheated.

It is a feature of the present invention that means are provided whereby concentrated solution is withdrawn from the vaporization chamber and is directed through preheater passage means about and adjacent the periphery of a preheater chamber. In preferred construction, the preheater chamber is provided with a double wall thereabout having a space between the wall members of the double wall, and means are provided for directing concentrated solution from the vaporization chamber into and through the space in the double wall so as to be in out-of-contact heat exchange relation with the solution in the preheater chamber that is in contact with the double wall. Within the preheater chamber is a primary preheater heat exchanger, which may be coiled piping through which hot condensate (condensed in the condenser heat exchanger) flows in out-of-contact counterflow heat exchange relation with solution in the preheater chamber.

The construction according to the present invention has certain very significant advantages. In the first place, by disposing the preheater passage means about the periphery of the preheater chamber, a much larger area of heat transfer surface can be afforded than is possible with a tube that passes through the middle of the preheater chamber and, due to the increased surface, it is possible to recover considerably more sensible heat from the concentrated solution withdrawn from the vaporization chamber before it is discharged from the system. This is particularly desirable in certain types of units, especially those operating on sea water or very hard water, which are operated with a high overflow rate so as to keep the concentration of solids in the overflow low and thereby avoid the excessive formation of scale deposits. It is also desirable to increase the heat exchange efficiency of the overflow according to this invention in order to minimize the tendency to upset the heat balance of the system due to variation in the rate of feed.

Further advantages of this invention result from the fact that the heat loss to the atmosphere from the exterior of the preheater chamber is taken directly from the concentrated solution overflowing from the vaporization chamber, rather than being taken from incoming fresh solution which it is desired to heat as much as possible. In this way, preheating of the incoming solution due to heat exchange with the primary heat exchanger in the preheater chamber is rendered more efficient, since heat losses from the solution being preheated are prevented and there is a substantial saving in the amount of heat transfer required in the unit, since heat which is wasted to considerable degree anyway is used to take care of heat loss from the periphery of the preheater chamber instead of heat which has been transferred into the incoming liquid by means of valuable heat transfer surface.

Other advantages of this invention reside from the fact that the overflow passages can be very readily cleaned and reconditioned. The overflow passages become encrusted with scale deposit more rapidly than the other parts of the apparatus. With the arrangement of this invention, these passages which are on the outside of the apparatus can readily be disassembled for cleaning without disturbing the rest of the apparatus. This is particularly the case where double wall construction is used with a space between the wall members, inasmuch as merely by separating the outer wall member from the inner wall member, the surfaces between the wall members can very readily be cleaned. Moreover, the double wall construction is very economical to manufacture and assemble.

Construction according to this invention is very advantageous in connection with distillation apparatus of the character described in my application executed on even date herewith for Distillation and heat exchange apparatus (Ser. No. 400,354 filed June 28, 1941) wherein conical coils are employed for condensing compressed vapor and passing hot condensate in out-of-contact heat exchange relation with incoming fresh solution.

Further features of this invention relate to the disposition of the overflow passage means that controls the normal liquid level of solution in the vaporization chamber. One simple type of overflow passage means may be provided by bringing up to the desired overflow level an inside wall, the overflow taking place over the top edge of the wall down through a space between the inner wall and the outer wall of the vaporization chamber. By leveling the unit, the overflow will take place more or less uniformly over the entire extent of the top of the inner wall. If, however, the unit is to be used on shipboard or in any place where there is motion of the unit, there is a tendency for the overflow to take place at the lowest point about the extent of the top of the wall, and if the unit is tilted to a considerable extent, there will be a substantial lowering of the liquid level in the unit and this may uncover a portion of the condenser heat exchanger with resulting reduction in the heat transfer surface and with a tendency to form scale and otherwise interfere with the operation of the unit. According to one of the features of this invention, the point or mouth where the overflow occurs is confined so that it lies in a plane which at least approximately bisects the vaporization chamber and is in the direction of least tilting of the unit. Thus in a unit for use on shipboard, the overflow is localized so as to be on the center line of the unit that runs fore and aft of the ship. For example, when the overflow is controlled by an inner wall, the inner wall may have notches or slots fore and aft on the center line referred to and may be considerably higher at other points. This affords substantial protection, since the angle of fore-and-aft pitching of a ship is usually considerably less than the angle of roll. It is also a feature of this invention that when the overflow point or mouth means is localized as above described, auxiliary overflow mouth means is provided substantially above the normal liquid level in the vaporization chamber, which auxiliary mouth means may be availed of in the event that the localized overflow point or points become clogged.

Further purposes, features and advantages of this invention will be apparent in connection with the following description of certain illustrative embodiments thereof shown in the accompanying drawings wherein Figure 1 is a side elevational view, partly in section, showing the compressor and the upper portion of the vaporization chamber of apparatus embodying this invention;

Fig. 2 is a side elevational view, partly in section, of the lower portion of the apparatus shown in Fig. 1, Fig. 2 being a continuation of the apparatus shown in Fig. 1;

Fig. 3 is a side elevational detail view of some of the nested coils shown in Fig. 2, the showing in Fig. 3 being on an enlarged scale;

Fig. 4 is a side elevational view of a modified embodiment of this invention with the compressor and bottom portion omitted;

Fig. 5 is a detail view taken on the line 5—5 of Fig. 4;

Fig. 6 is a side elevational view, largely schematic, of a modified form of this invention; and Fig. 7 is a side elevational view, largely schematic, of an additional modified form of this invention.

Referring to the embodiment of this invention shown in Figs. 1 to 3, the apparatus comprises a vaporization chamber 15 which is suspended from support members 16 by bolts 17. Also carried by the support members and by the bolts 17 is a casting or mounting plate 18 to the upper side of which there is secured a compressor 19. Suspended from the casting 18 and secured thereto by bolts 20 is a baffle member 21 forming part of the liquid-vapor separator which is indicated generally by the reference character 22. In the casting 18 are apertures 23 which communicate between the interior of the liquid-vapor separator and the inlet passages 24 associated with the compressor. The compressor may be of the Roots-Connersville type, comprising two coacting impeller members 25 which impel vapor withdrawn from the liquid-vapor separator downwardly through the aperture 26 in the casting 18. The compressor may be operated by any suitable motor (not shown) which may, for example, be an electric motor. Any other suitable compressor may be used, if desired.

Within the vaporization chamber there are a plurality of conical coils of piping, the coils being nested together in close proximity to each other and with the larger ends of the coils upward. Each coil is composed of a plurality of lengths of piping or tubing 29, e. g., six, coiled together so that a vapor or liquid passing into the upper ends of each of the six lengths of tubing will pass downwardly through the composite coil in parallel relation to each other. These intercoiled lengths of tubing or piping will be referred to as coil elements forming part of the conical coils as a whole. The invidual conical coils taken as a whole are indicated by the reference characters 30, 31, 32, 33, 34, 35, 36, 37, 38 and 39. In order to introduce vapor compressed by the compressor into the interior of the coils 30—39, suitable headering arrangement is used which may be of the type shown in the drawings having the following construction.

The casting 18 includes an annular passage 40 and passages 41 leading from the aperture 26 to the annular passage 40; and extending downwardly from the annular passage 40 are vertical header members 42. The lower portions of these vertical header members may be secured to the upper portions by the detachable unions 43, but these unions may, if desired, be omitted. The lower end of the aperture 26 is covered by a detachable plate 44.

As mentioned above, each of the cone-shaped coils comprises six-lengths of coil elements or coil piping. Thus, for example, the conical coil indicated generally by the reference character 30 comprises the coil elements 30a, 30b, 30c, 30d, 30e and 30f. The upper end of each coil element communicates with one of the downwardly extending headers 42, there being six headers in the embodiment herein described, namely, one for each of the six coil elements of the conical coils. The coil elements are attached to the vertical headers by the detachable unions 45. In a similar way, each of the six coil elements of the conical coils 31 to 39 is secured by detachable connections to the headers 42, and so as to communicate therewith at different vertical positions along the vertical headers, as clearly shown in the drawings, particularly in Figs. 1 and 2.

The lower ends of the coil elements communicate with suitable headering means. Each of the conical coils communicates with a header member 46, and each of the header members 46 communicates with, and is detachably united to, a vertical draw-off line 47. In the drawings, the sections of the piping in the mid-portion of the coils have been omitted for clarity in the showing, but it is to be understood that the piping is continuously coiled from top to bottom of the coils.

Between each of the coils 30—39 are disposed conically-shaped metal spacing means 48 which may be referred to for the sake of brevity as "shields." These shields extend from the lower portion of the conical coils and do not extend completely to the upper ends of the conical coils, but discontinue approximately at the point at which boiling begins to occur during the operation of the apparatus. The conical coils and shields, therefore, are nested together in contact with each other throughout the lower portion of the conical coils and the conical coils are out of contact with each other in the region above the shields. By this construction, small tortuous passages are provided between the exterior surface of the piping of the coils and the conical shields. These passages become of larger total cross-sectional area in the region between the coils that extend above the shields.

Within the coil elements is disposed a filler element 49 which is preferably in the form of a square wire and which restricts, but does not fully fill, the cross-sectional area in the interior of the piping. This filler element normally extends from the bottom of each conical coil element up to approximately the region of the upper ends of the conical shield that is in contact with the inner side of the coil. These filler elements serve to restrict the cross-sectional flow capacity of the piping in the lower portion of the conical coils.

In operation, the vapor compressed by the compressor is directed by the headering means into the upper ends of the coils 30 to 39 and condenses in the upper portion of these coils. The upper portion of the coils is, therefore, to be regarded as a condenser heat exchanger adapted and arranged to maintain the condensing vapor in out-of-contact heat exchange relation with solution in the vaporization chamber undergoing vaporization. The condensate condensed in the upper portion of the coils 30 to 39 flows downwardly through the coils and is brought into heat exchange relation with incoming fresh solution that is moving upwardly in the unit (as will be described more in detail hereinbelow) and serves to preheat the incoming solution before it reaches the vaporization zone. Therefore the lower portion of the coils is regarded as a preheater heat exchanger. In this particular embodiment, the condenser heat exchanger and the preheater heat exchanger are different parts of the same coil, but it is apparent that the condenser heat exchanger and the preheater heat exchanger may be separated from each other or may be of substantially different construction.

Inside of the coil 30 is nested the baffle sheet 50, the lower end of which is conical and serves to direct the flow of incoming solution through the tortuous passages between and along the conical coils. The upper cylindrical end of the baffle sheet 50 serves as a baffle forming part of the liquid-vapor separator 22. A plate 51 integrally united with the baffle sheet 50 forms the bottom of the liquid-vapor separator 22; and leading downwardly from the plate 51, is a vent line 52 adapted to conduct any liquid in the liquid-vapor separator out of the system. At the bottom of the baffle sheet 50 is another plate 53 which seals the bottom portion of the baffle sheet 50 and through which the vent line 52 passes in liquid-tight connection therewith.

The solution to be distilled is fed into the apparatus through line 54 by any suitable means, such as a gravity head, and may be controlled by a valve 110 in the line 54. Alternatively, the solution can be fed into the apparatus by a positive displacement pump, the rate of feed being determined by the rate of operation of the pump as described in my application, Serial No. 371,298, filed December 3, 1940, for Apparatus for and method of distillation.

In the lower portion of the baffle sheet 21 are louvers 55 so that vapor, which is evolved from the solution in the vaporization chamber 15, and which is directed downwardly through the passage 56 between the baffles 21 and 50, will have imparted thereto a revolving motion within the liquid-vapor separator 22.

If desired, a valve-control bypass may be employed between the compression side of the compressor and the interior of the vaporization chamber so as to facilitate the institution of a distillation operation as described in my patents, Nos. 2,185,595 and 2,185,596. For example, vapor can be withdrawn from the compression side of the impellers 25 through the bypass line 57 controlled by valve 58. The mouth 59 of the bypass line 57 is adjacent the normal liquid level of solution in the vaporization chamber 15.

At the bottom of the apparatus is a base plate 60 which can be removed by removing nuts 61 from bolts 62 and by removing the nuts 63 and 64. The nut 64 is in threaded engagement with the vent line 52 and is spaced from the lower surface of the plate 60 by a spacing member 65 which bears against the packing 66 when the nut 64 is tightened down. When the nut 64 is tightened down, this operation not only serves to compress the packing 66 against the surface of the draw-off line 52, so as to provide a liquid-tight joint, but also serves to draw down the baffle sheet 50 so as to compress the conical coils and shields between the baffle sheet 50 and the wall 67, thereby bringing the surfaces of the piping of the conical coils and of the shields into intimate contact and also pressing the baffle sheets 50 and the wall 67 against the conical coils immediately adjacent thereto.

In operation the fresh solution that enters the apparatus is preheated as it flows upwardly between the coils 30 to 39. It begins to boil about the coil 39 ordinarily in the neighborhood of the top of wall 67. About coil 30 it begins to boil approximately where plate 51 is united to the baffle sheet 50. About the intermediate coils the solution begins to boil in a region intermediate the positions above mentioned. Therefore the upper cylindrical part of the apparatus is the vaporization chamber and the lower conical portion is a preheater chamber. These chambers may merge continuously one with another or may be spaced from each other. It is not essential that the preheater chamber or preheater coils be conical in shape.

The apparatus hereinabove described is generally similar to the apparatus described and claimed in my application, executed on even date, for Distillation and heat exchange apparatus (Serial No. 400,354, filed June 28, 1941). The features of the present invention relate primarily to the means for withdrawing concentrated solution from the vaporization chamber and using same to preheat incoming solution and to the combination of such means with the apparatus of the type hereinabove described.

One means for withdrawing concentrated solution from the vaporization chamber according to this invention is shown in Figs. 1 and 2. Within the outer wall of the vaporization chamber 15 is a cylindrical inner wall member 68 which is spaced from the outer wall of the vaporization chamber, leaving annular space 69 therebetween affording overflow passage means through which concentrated solution can be removed from the vaporization chamber. The inner wall 68 is maintained in place by a ring member 70 to which it is attached, as by brazing. The ring member 70 is spaced from another ring member 71 by spacing members 72 which provide passages 73 between the annular space 69 and the conical annular space 74 between the wall member 67 (hereinabove referred to) and an outside wall member 75, which conical annular space provides preheater passage means through which concentrated solution taken from the vaporization chamber can flow downwardly in out-of-contact counterflow heat exchange relation with solution moving upwardly in the preheater chamber. The wall member 75 may be attached to the ring member 71, as by brazing. The two ring members 70 and 71 are secured to each other, with the spacing members 72 therebetween, by the bolts 76. At the bottom of the annular passage 74 is an enlarged chamber 77 with which the outlet line 78 communicates. The outlet line 78 extends upwardly to provide a "water leg" 79 which has the effect of maintaining the annular passages 74 and 77 flooded as well as the region adjacent the passages 73 that afford communication between the passages 69 and 74.

In the embodiment of this invention shown in Figs. 1 and 2, the normal liquid level of solution in the vaporization chamber is controlled by the position of the lower end 111 of slot 112 in the wall member 68. If by any chance the slot 112 should become clogged, the liquid level in the vaporization chamber would rise until it reaches the upper edge 88 of the wall member 68. The liquid would then overflow the edge 88 and the distillation operation could be continued until such time as the apparatus is disassembled for cleaning and reconditioning. The foregoing arrangement wherein the mouth means for the overflow passage which controls the normal liquid level of solution in the vaporization chamber is of limited lateral extent and is used in conjunction with auxiliary mouth means located substantially above the mouth means, is of especial advantage when the distillation apparatus may be subjected to tilting, e. g., when used on ships. If the slot 112 is in a plane that at least approximately bisects the vaporization chamber and that is parallel to the longitudinal extent of the ship, it is apparent that rocking of the ship from side to side will not unduly disturb the uniformity of overflow of concentrated solution from the vaporization chamber. Since the rocking or rolling tendency of a ship is usually much more severe than the tendency of a ship to pitch, the arrangement shown in Figs. 1 and 2 has especial utility in connection with distillation apparatus employed on ships. If desired, an additional slot similar to 112 could be used disposed about 180° from the slot 112; that is, in the same plane bisecting the vaporization chamber that slot 112 is in, and normally such an additional slot is employed to afford more uniform distribution of concentrated solution to the space 74 about the preheater chamber. It may be mentioned in this connection that the water leg 79 causes the lower portion of space 69 to remain flooded and acts as a laterally disposed channel means in which the concentrated solution will become substantially uniformly distributed before flowing downwardly through the annular space or passage 74.

In utilizing the apparatus hereinabove described, the solution to be distilled may be fed into the apparatus through the feed line 54. In instituting distillation, the solution is fed into the apparatus until the solution overflows the bottom 111 of the slot 112 in the wall member 68. Operation of the compressor is then started, while the valve 58 in the bypass line 57 may be opened. The work performed by the compressor assists in heating the surface of the solution to its boiling point so that vapor will be evolved therefrom. As the amount of evolved vapor increases, the air is gradually discharged from the system and the vapor begins condensing in the upper portion of the conical coils. Eventually the condensation of the compressed vapors in the coils will supply sufficient heat for maintaining the distillation. The valve 58 is then closed and the distillation continued merely by operating the compressor. If desired, the institution of the distillation operation may be assisted by the use of heating elements, e. g., electric heating elements for heating solution in the vaporization chamber.

During the distillation, the compressed vapor condenses in the upper portion of the conical coils. Since the condensing temperature of the compressed vapor is higher than the boiling point of the solution in the vaporization chamber, the condensing vapor will supply the heat for causing boiling of the solution in the vaporization chamber. The vapor condenses in the portion of the coils which does not contain the filler elements that occupy the lower portion of the conical coils and that restrict the cross-sectional flow capacity of the lower portion and the solution surrounding this portion of the coils is subjected to boiling. The region about the upper portion of the coils is, as mentioned above, the vaporization zone in the apparatus. The condensate which forms in the upper portion of the coils flows down through the conical coils in the portion thereof occupied by the filler elements. Sensible heat contained in the condensate is transferred to incoming solution in the tortuous passages between the coils and serves to preheat the solution which is moving upward in the vaporization zone by counterflow out-of-contact heat exchange. The portion of the apparatus surrounding the lower ends of the coils is, as mentioned above, the preheating zone of the apparatus. During the continuance of the operation, fresh solution is continuously fed into the apparatus to compensate for the vapor which is evolved in the vaporization zone and compressed in the compressor, and also to compensate for the concentrated solution which is withdrawn from the vaporization chamber during the distillation operation. As the incoming solution reaches the coils, it begins to be preheated and continues to be preheated as it flows upwardly along the conical coils. The point at which the solution reaches its boiling point preferably corresponds approximately to the location of the upper edge of the conical shields 48.

The incoming solution not only is preheated by the condensate within the conical coils, but also is preheated by contact with the peripheral wall of the preheating chamber. It is to be noted that the concentrated solution flows down through the annular passage 69 about the outside of the vaporization chamber and then flows down through the annular passage 74 around the preheating chamber. It is, therefore, apparent that the sensible heat in the withdrawn concentrated solution is brought into out-of-contact counterflow heat-exchange relation with incoming fresh solution. This serves materially in conserving heat and in maintaining the proper heat balance. Since the concentrated solution is confined by a wall member which preferably completely surrounds the preheating chamber, the concentrated solution is distributed so as to supply sensible heat to a relatively large area of surface in heat-exchange relation with the incoming solution. This contributes to the efficiency of the apparatus and affords a considerably more efficient arrangement than merely extending a draw-off line down through the preheater chamber, as described in my Patent No. 2,185,595. Further, in this regard, it is to be noted that the incoming solution is kept spaced from the outermost wall of the apparatus so that the heat loss is from the concentrated solution being withdrawn from the system rather than from the incoming solution which it is desired to heat to as high temperature as possible with minimum heat losses to the outside. This also is advantageous in facilitating the preheating of the incoming solution to its boiling point before it enters the vaporization zone. By providing a water leg, as shown, the preheater passage means, which is adjacent and which is distributed about the periphery of the preheater chamber, is kept flooded with the concentrated solution being withdrawn from the vaporization chamber. In this manner, the concentrated solution is distributed relatively uniformly about the periphery of the preheater chamber.

Another advantage of the construction described is that the overflow passages can be readily cleaned. By removing the nuts 61, 63 and 64, the base plate 60 may be removed. Thereafter, it is a relatively simple matter to disconnect the nuts 81 from the bolts 17 and also remove the bolts 76 so that the wall members 15, 68, 67 and 75 may be removed from the under side of the mounting member 18 and then completely disassembled so that the interior surfaces of the annular passage means therebetween may be thoroughly cleaned and reconditioned.

A modified form of this invention is shown in Figs. 4 and 5. The compressor and the lower portion of the apparatus have been omitted inasmuch as they may be identical with the embodiment of this invention shown in Figs. 1 and 2. The rest of the apparatus shown in Fig. 4 may also be identical with the apparatus shown in Figs. 1 and 2 with the exception of the provision for withdrawing concentrated solution from the vaporization chamber. To the extent that the showing in Fig. 4 is identical with the showing of Figs. 1 and 2, the corresponding parts have been indicated by corresponding reference characters.

In Fig. 4, the normal liquid level in the vaporization chamber is controlled by a pair of overflow lines 82, the upper mouths of which are at substantially the same level. In addition to the overflow lines 82, there is one or more overflow lines 83, the upper mouth of which is somewhat higher than the upper mouth of the lines 82. The lines 82 are adjacent the periphery of the vaporization chamber and are disposed 180° from each other so that they lie in a single plane that at least approximately bisects the vaporization chamber. The upper end of overflow line or lines 83 is not in such plane and preferably is in a plane at 90° to such plane. This arrangement constitutes another way by which the effect of sideward rocking of a boat may be minimized. The lines 82 and 83 communicate at their lower ends with a laterally disposed annular passage 84, which is sealed from the interior of the vaporization chamber by the ring member 85 into which the lines 82 and 83 are secured as by threading. The preheater chamber of the apparatus comprises the wall members 67 and 75 as described above in connection with Figs. 1 and 2, which have the conical annular space 74 therebetween. The annular channel 84 is maintained in communication with the annular space or passage 74 by the passages 73 in the spacing members 72.

The operation of the embodiment shown in Fig. 4 is essentially the same as that above described in connection with Figs. 1 and 2. During the distillation, the concentrated solution is normally withdrawn through the pair of overflow lines 82 and flows downwardly therethrough to the annular channel 84 which distributes the hot overflow to the annular passage 74 where it serves to preheat the incoming solution in the manner hereinabove described. The water leg 79 serves to keep the passage 74 and the annular channel 84 flooded with the hot concentrated solution so that it becomes evenly distributed as it flows downwardly through the passage 74.

If for any reason the passages 82 should become clogged, the passages 83 will afford an emergency outlet. Normally, however, the liquid level is controlled by the level of the upper mouth of the lines 82.

In Fig. 6, a further embodiment of this invention is shown. This apparatus includes a vaporization chamber 90, in which there is a condenser heat exchanger 91. Vapor is withdrawn from the vaporization chamber past baffles 92 to the compressor 93, and compressed vapor is directed from the compressor to the condenser heat exchanger 91. The condensate is passed through a preheater heat exchanger 94 in counterflow heat exchange relation with incoming solution in preheater chamber 95, and the cooled condensate is discharged from the system through the line 96. Solution is fed into the system adjacent the bottom of the preheater chamber by line 97 controlled by valve 98 from tank 99. In this embodiment of my invention, there is an annular wall member 100 which is spaced from the wall member 90 by an annular space 101. At the bottom of the vaporization chamber, the space 101 provided by the wall member 100 is closed by a plate 102 in which are secured a plurality of pipes 104 which are disposed about and adjacent the periphery of the preheater chamber and the upper ends of which are in communication with the passage 101. The bottom of the pipes 104 is in communication with an annular header 105, and solution is taken from this header by line 106 containing a "water leg" 107.

In operation, the device of Fig. 6 is generally similar to that of the embodiments of my invention hereinabove described. The top 108 of the wall member 100 controls the liquid level in the vaporization chamber, and the hot concentrated solution flows downwardly through the annular space 101. The pipes 104 afford preheater passage means about and adjacent the periphery of the preheater chamber 95. By using a plurality of pipes 104, a relatively large amount of surface area is afforded which is in heat exchange relation with solution in the preheating chamber. The water leg keeps the passages in the pipes 104 through which the concentrated solution flows and the bottom of the annular space 101 flooded so that there will be substantially uniform distribution of the concentrated solution among the different pipes 104.

The embodiment of this invention shown in Fig. 6 illustrates that it is not essential in the practice of this invention to construct a distillation apparatus having an overflow for a concentrated solution distributed about the periphery of the preheater chamber by resort to a double wall construction, such as that shown in Figs. 1 to 5. Such double wall construction is, however, regarded as preferable. Moreover, the embodiment shown in Fig. 6 illustrates a type of overflow arrangement for a unit which is ordinarily not subject to tilting during use thereof.

A further modification of this invention is shown schematically in Fig. 7. This apparatus includes a vaporization chamber 120 in which there is a condenser heat exchanger 122. Vapor is withdrawn past baffles 103 to the compressor 124, and compressed vapor is directed from the compressor to the condenser heat exchanger 122. The condensate from the condenser heat exchanger 122 is directed by line 125 to the preheater heat exchanger 126, wherein it goes through passages 127 and from which it is discharged from the system by line 128. Fresh solution from tank 109 is fed by line 130 controlled by valve 131 into an inner jacket 132 which directs the feed solution about the exterior of passages 127 in out-of-contact and counterflow heat exchange relation with the distillate in said passages so as to preheat the incoming feed. The preheated feed is directed by line 113 from the jacket 132 to the vaporization chamber 120 where it is partially vaporized. The portion of the feed not vaporized in the vaporization chamber is withdrawn therefrom by the overflow line 114 which directs the overflow of concentrated solution into the space 115 between the jacket 132 and an outer wall 116 of the preheater heat exchanger. The concentrated solution flows out of the preheater heat exchanger 126 by line 117 and, while flowing through the preheater heat exchanger, flows in out-of-contact and counterflow heat exchange relation with incoming feed solution in the inside of the jacket 132. The space 115 may be essentially continuous about the jacket 132 or discontinuous and is kept flooded as shown.

The embodiment of this invention shown in Fig. 7 illustrates that it is not essential in the practice of the invention that the preheater heat exchanger, containing passage means distributed about the periphery thereof, be a continuous part of a vaporization chamber or a direct continuation of a condenser heat exchanger. On the other hand, the preheater heat exchanger may be a separate unit as shown in Fig. 7.

It is apparent that other forms of apparatus may embody the invention herein described. In this connection, it is not necessarily essential that the fluid passing through the preheater heat exchanger to preheat incoming solution be derived from condensate flowing from a condenser heat exchanger in the vaporization zone. Moreover, it is not essential that the heating means in the vaporization zone be supplied by compressing vapor evolved in the vaporization zone and condensing the compressed vapor in a condenser heat exchanger in the vaporization zone.

In order to afford a better understanding of this invention, a typical distillation unit will be described, together with a typical operation utilizing such unit, it being understood, however, that this typical unit and operation is described merely for purposes of exemplification.

A distilling apparatus according to this invention for producing 1500 gallons of distilled water per day from sea water may, for example, be composed of 15 conical coils each formed from 8 tube elements. Each tube element is ¼" outside diameter by 20 gauge and has an inside diameter of .180"; and each tube element is approximately 42' long. The lower 30' of these tubes (at the small end of the conical coil) contains a square rod or wire approximately ⅛" on a side. At the top, these tubes are attached by unions to eight 1" outside diameter vertical headers having $\tfrac{1}{16}$" thick walls. One tube of each conical coil is attached to each of the eight headers by a union. At the bottom, each of the eight tubes of one coil is brazed into a ⅜" O. D. semicircular header, this header in turn being connected by a union to a ⅜" iron pipe size vertical header which extends downward through the bottom plate of the still. Each coil is produced by winding on a conical form having a 4" diameter at the smaller end and approximately 19" diameter at the larger end and having an included angle of 30°, the over-all length of the cone measured along the conical surface being approximately 28".

Between the coils are placed conical shields composed of 25 gauge metal having 4" diameter at the bottom and a length of approximately 20", thus leaving the top of the coils unshielded.

The inner conical baffle extends up until it is approximately 17" in diameter, at which point the bottom of the vertical cylindrical section is attached, and adjacent which point is attached the horizontal plate forming the bottom of the vapor separator. From the center of this horizontal plate, a ½" iron pipe size tube extends straight down along the axis of the coils through the space within the semicircular headers and straight out through the bottom plate of the still. This pipe is the vent.

The outer wall of the heat exchanger also is conical and extends upward to a flange near the top of the lowest conical coil, at which point the flange increases the diameter to approximately 24" which is the diameter of the outer wall of the vaporization chamber, which wall is attached at the bottom thereof to the flange. Outside of the conical wall of the heat exchanger is a second wall spaced from it about ⅛" and forming the overflow passage for the heat exchanger. The over-all height of the vapor separator from the circular bottom plate to the flange which forms the top of the vapor separator and the base for the blower is approximately 18".

Inside the outer wall of the vaporization chamber and spaced therefrom by about ⅛" is another wall extending upwardly from the flange to about ½" above the top coil. Concentrated solution in the vaporization chamber will flow over the top of this wall down to the conical annular passage about the preheater heat exchanger. The compressor should be capable of displacing 240 cubic feet per minute of vapor at suction conditions and of developing a pressure difference of approximately 5 pounds per square inch, normally, with a maximum of 7 pounds. The water leg on the overflow discharge pipe is brought up to approximately the top of the conical portion of the outer shell. A locknut threaded on the lower end of the vent pipe just outside the bottom plate makes up against a packing which serves at once to seal the crack around the vent pipe where the latter goes through the bottom plate and at the same time serves to pull the vent pipe and the attached inner baffle cone snugly and firmly down against the conical coils. In so doing, it also forces the coils down against the conical wall on the outside of the conical coils in the heat exchanger and brings all the elements of the heat exchanger into firm, positive contact.

The remaining details of this equipment are substantially as described previously. In operation, cold sea water is led in through a flow control valve to the interior of the heat exchanger through a hole tapped in the bottom plate. It then passes up through the tortuous passages between the conical shields and the tubes of the conical coils and in the assembly described it requires approximately 4-6" water pressure to force the required flow through these tubes when cold and a somewhat higher pressure after boiling starts. As the water passes up through the heat exchanger, it is heated to boiling at approximately the time it reaches the top of the conical shields and starts to boil. The mixture of water and steam which is then rapidly increasing in volume passes up through the spaces between the coils which were occupied below by the shields as well as to a certain extent in the tortuous passages between the turns of the coils. By the time it reaches the top of the coils, a considerable portion, e. g., about three-fourths in a typical operation, of the water has been turned to steam. The remaining unevaporated water overflows the top of the inner wall of the vaporization chamber, and passes down between the double exterior walls of the heat exchanger and out of the apparatus through the water leg and an overflow cup or sight drip 121 located at approximately the level of the top of the conical portion of the shell. The steam continues upward over the top of the cylindrical portion of the inner baffle, down through louvres into the interior of the vapor separator. Any traces of moisture which remain at this point are spun out against the walls of the vapor separator and flow down to the bottom and out the central vent pipe. Also any steam which is formed in excess of that which can be handled by the blower will escape through the vent. The remaining steam passes up through the top of the vapor separator into the compressor where it is compressed to approximately 5 pounds pressure and forced down through header passages in the plate which forms the top of the vapor separator and becomes distributed to the eight 1" headers from which it is distributed to the various tubes of the coils. As it passes downward through the unobstructed portions of the coils, it is condensed, giving up its latent heat to evaporate more feed water on the outside of the coils. By the time it reaches the point where the square cores begin, practically the entire steam is condensed and the water formed passes down through the narrow passages between the square rods and the circular walls of the tubes, thus being effectively cooled and returning its heat to the incoming feed water. This condensate is discharged from the individual tubes into the semi-circular headers at the bottom and from them into the main vertical discharge draw-off pipe by which it is discharged from the unit, forming the distilled water output.

In the exchanger described, the feed water entering may be at 50° F., the steam entering the compressor at approximately 215° F., the steam leaving the compressor at a temperature between 260 and 300° F. (depending upon the efficiency of the compressor), and the condensate leaving the system may be at approximately 70° F. The overflow may be in the vicinity of 120° F. Again, depending upon the efficiency of the compressor, the power consumption required to operate the compressor and to furnish all heat losses will be between 6 and 10 kilowatts. During operation, some scale tends to form where there is contact with incoming fresh solution or withdrawn concentrated solution. As the unit becomes foul with scale, the pressure at the compressor discharge and the temperature of the steam discharged from the compressor will gradually increase. The power consumption of the motor will also gradually increase until a point is reached at which it is no longer safe to operate the compressor continuously or at which the motor is overloaded. When this occurs, the unit is shut down and cleaned. This is simply done by dropping the outside casing and disconnecting the individual coils which are then removed and brushed inside and out with a wire brush. The conical shields between the coils are also removed and cleaned, if necessary. The coils and shields may then be reassembled, and the outer casing put on and bolted up. The unit is then ready to operate again. Since all the heating surfaces of the coils are easily accessible when the coils are disassembled, the cleaning is very easily and thoroughly done. The surfaces of the coils and their condition may be readily inspected and the entire unit is quickly put into normal operating condition again. It is not necessary to use any complicated means of getting into long lengths of small tubing nor to the outside surfaces of a multiplicity of tubes which are arranged in headers close together. Also it is found that in this type of unit the scale which forms from sea water is of a soft, granular or chalky nature and that particularly while it is wet, it is very easily brushed from the tubes. This is presumably due to the low temperatures at which the unit operates. Since the condensing temperature of the steam in the coils is only approximately 225° F. and since the amount of evaporation per square foot of coil surface is therefore relatively low, the scale does not burn on as it does in high pressure evaporators and does not need to be chipped or hammered off as is frequently the case in other types of unit.

While the apparatus described has been referred to herein as distillation apparatus, there are features of this invention that have utility for carrying out operations other than those which involve evaporation or condensation of a liquid, e. g., for carrying out heat exchange between two fluids.

While this invention has been described in connection with certain illustrative embodiments and examples of the practice thereof, it is to be understood that this has been done merely for the purpose of illustration and that the scope of this invention is to be governed by the language of the following claims construed in the light of the foregoing description.

I claim:

1. In distillation apparatus of the character described, including a vaporization chamber, a preheater chamber, means arranged for directing solution into said preheater chamber, means arranged for directing solution preheated in said preheater chamber from said preheater chamber into said vaporization chamber, a compressor, means arranged for directing vapor from said vaporization chamber into said compressor, a condenser heat exchanger in said vaporization chamber, means for directing vapor compressed by said compressor from said compressor into said condenser heat exchanger in out-of-contact heat-exchange relation with solution in said vaporization chamber, a preheater heat exchanger in said preheater chamber, and means for directing condensate from said condenser heat exchanger into said preheater heat exchanger in out-of-contact heat-exchange relation with solution in said preheater chamber, means for withdrawing concentrated solution from said apparatus, said last-named means comprising preheater passage means adjacent and distributed about the periphery of said preheater chamber and about the larger bulk of the solution in said preheater chamber and arranged to maintain a solution contained therein in out-of-contact heat-exchange relation with the solution in said preheater chamber distributed about and adjacent the periphery thereof, and means for directing concentrated solution from said vaporization chamber to said preheater passage means.

2. Distillation apparatus, according to claim 1, which also includes means for maintaining said preheater passage means flooded with concentrated solution withdrawn from said vaporization zone.

3. In distillation apparatus of the character described, including a vaporization chamber, a vertically extending preheater chamber, means for directing solution into said preheater chamber adjacent the bottom thereof and upwardly therethrough, means for directing solution from the upper portion of said preheater chamber to said vaporization chamber, a compressor, means arranged for directing vapor from said vaporization chamber into said compressor, condenser heat exchanger in said vaporization chamber, means for directing vapor compressed by said compressor from said compressor into said condenser heat exchanger in out-of-contact heat-exchange relation with solution in said vaporization chamber, a preheater heat exchanger in said preheater chamber arranged to direct a liquid downwardly in out-of-contact counterflow heat-exchange relation with solution moving upwardly in said preheater chamber, and means for directing condensate condensed in said condenser heat exchanger from said condenser heat exchanger to said preheater heat exchanger adjacent the upper end thereof, means for withdrawing concentrated solution from said apparatus, said last-named means comprising downwardly extending preheater passage means adjacent to and distributed about the periphery of said preheater chamber and about the larger bulk of the solution in said preheater chamber, means arranged for directing concentrated solution from said vaporization chamber to said preheater passage means including laterally disposed channel means, and means for maintaining said passage means and said channel means flooded with the concentrated solution withdrawn from the vaporization chamber.

4. In distillation apparatus of the character described, including a vaporization chamber, a preheater chamber, means arranged for directing solution into said preheater chamber, means arranged for directing solution preheated in said preheater chamber from said preheater chamber into said vaporization chamber, a compressor, means arranged for directing vapor from said vaporization chamber into said compressor, a condenser heat exchanger in said vaporization chamber, means for directing vapor compressed by said compressor from said compressor into said condenser heat exchanger in out-of-contact heat exchange relation with solution in said vaporization chamber, a preheater heat exchanger in said preheater chamber, and means for directing condensate from said condenser heat exchanger into said preheater heat exchanger in out-of-contact heat-exchange relation with solution in said preheater chamber, and means for withdrawing concentrated solution from said apparatus, said last-named means comprising a double wall about said preheater chamber having a space between the wall members thereof so that a liquid in said space will be in out-of-contact heat-exchange relation with solution in said preheater chamber, and means arranged for directing concentrated solution from said vaporization chamber through said space in said double wall.

5. Distillation apparatus comprising a vaporization chamber, means for heating solution in said chamber and causing boiling of said solution in said chamber, a preheater chamber, a preheater heat exchanger in said preheater chamber, means for directing a fluid into said preheater heat exchanger in out-of-contact heat-exchange relation with liquid in said preheater chamber to preheat said liquid, means for directing preheated liquid from said preheater chamber to said vaporization chamber, preheater passage means adjacent to and distributed about the periphery of said preheater chamber and about the larger bulk of the solution in said preheater chamber and arranged to maintain a solution contained therein in out-of-contact heat-exchange relation with solution in the preheater chamber, and means for directing concentrated solution from said vaporization chamber to said preheater passage means.

6. Distillation apparatus which comprises a vaporization chamber, means for heating solution in said chamber and thereby causing boiling of said solution in said chamber, means for withdrawing from said chamber vapor evolved from solution boiling in said chamber, a preheater chamber, a preheater heat exchanger in said preheater chamber, means for directing a fluid into said preheater heat exchanger in out-of-contact heat exchange with solution in said chamber to preheat said solution, means for directing preheated solution from said preheater chamber to said vaporization chamber, a double wall disposed about said preheater chamber having a space between the wall members thereof and arranged so that a fluid contained in said space is in out-of-contact heat-exchange relation with solution in said preheater chamber in contact with the inner of said wall members, and means for directing concentrated solution from said vaporization chamber through said space.

7. Distillation apparatus comprising a vaporization chamber, means for heating solution in said chamber and causing boiling of solution in said chamber, a preheater chamber below the normal liquid level of solution in said vaporization chamber, feeding means for feeding solution into said preheater chamber to be preheated therein, means for directing preheated solution from said preheater chamber to said vaporization chamber, a preheater heat exchanger in said preheater chamber, means for directing a fluid into said preheater heat exchanger in out-of-contact heat-exchange relation with solution in said preheater chamber to preheat solution in said preheater chamber, overflow passage means having mouth means that determines the normal liquid level of solution in said vaporization chamber and which is arranged to withdraw concentrated solution from said vaporization chamber, preheater passage means distributed about and adjacent the periphery of said preheater chamber arranged to maintain a fluid therein in out-of-contact heat exchange-relation with solution in said preheater chamber, and means for directing concentrated solution from said overflow passage means into said preheater passage means.

8. Distillation apparatus, according to claim 7, wherein said mouth means for the overflow passage that controls the normal liquid level of solution in said vaporization chamber is confined substantially to a single plane which, at least approximately, bisects the vaporization chamber.

9. Distillation apparatus, according to claim 7, wherein said mouth means for the overflow passage that controls the normal liquid level of solution in said vaporization chamber is confined substantially to a single plane which, at least approximately, bisects the vaporization chamber, and wherein said overflow passage means has auxiliary mouth means located in said vaporization chamber substantially above the normal liquid level of solution in said vaporization chamber.

10. Distillation apparatus, according to claim 7, wherein said overflow passage means is in the form of a space between wall members about said vaporization zone, the inner wall member having a normal overflow zone that is confined to a single plane that, at least approximately, bisects said vaporization zone, and another overflow zone at a substantially higher level.

11. Distillation apparatus, according to claim 7, wherein said overflow passage means is in the form of pipe means having mouth means at the normal liquid level of solution in said chamber that is confined to a single plane that, at least approximately, bisects said vaporization zone and wherein there is supplemental overflow passage means in the form of pipe means having mouth means substantially above the normal liquid level of solution in said vaporization chamber.

12. Distillation apparatus, comprising a vaporization chamber, means for heating solution in said chamber and causing boiling of solution in said chamber, a preheater chamber below the normal liquid level of solution in said vaporization chamber, feeding means arranged for feeding solution into said preheater chamber adjacent the bottom thereof to be preheated therein, means for directing preheated solution from adjacent the upper part of said preheater chamber to said vaporization chamber adjacent the lower part of said vaporization chamber, a preheater heat exchanger in said preheater chamber, means for directing a fluid in said preheater heat exchanger in out-of-contact counterflow heat-exchange relation with solution moving upwardly in said preheater chamber, overflow passage means having mouth means that determines the normal liquid level of solution in said vaporization chamber, vertically extending spaced wall members about said preheater chamber arranged so that fluid in the space between the wall members is in out-of-contact heat-exchange relation with solution in contact with the interior wall member, means for directing concentrated solution from said overflow passage means downwardly through said space between said wall members in counterflow heat-exchange relation with solution moving upwardly in said chamber, and means for maintaining said space between said wall members flooded with solution being withdrawn from said vaporization chamber.

13. Distillation apparatus, according to claim 12, wherein said overflow passage means is in the form of a space between wall members about said vaporization chamber and wherein said space between said wall members about said vaporization chamber is above and in communication with said space between the said wall members about said preheater chamber.

14. Distillation apparatus, according to claim 12, wherein said overflow passage means is in the form of pipe means arranged to direct solution from the normal liquid level of solution in said vaporiation chamber to the said space between the said wall members about said preheater chamber.

15. Distillation apparatus, comprising a vaporization chamber, a conical preheating chamber directly below said vaporization chamber with the larger end upwardly, a plurality of conical coils of piping extending from said preheater chamber upwardly into said vaporization chamber with the larger ends upwardly, a compressor, means arranged for directing compressed vapor from said vaporization chamber to said compressor for compression therein, means arranged for directing compressed vapor from said compressor to the upper ends of said conical coils, means for directing solution into said preheater chamber adjacent the lower ends of said coils and upwardly in contact with the piping of said coils into said vaporization chamber, cone-shaped wall members about said preheater chamber with a conical annular space therebetween, overflow passage means having mouth means at the normal liquid level of solution in said vaporization chamber for directing concentrated solution from said vaporization chamber, means for directing concentrated solution from said overflow passage means to said annular conical space and downwardly therethrough in out-of-contact counterflow heat-exchange relation with solution moving upwardly in said preheater chamber, and means for maintaining said annular conical space about said preheater chamber flooded with concentrated solution.

16. Distillation apparatus, according to claim 15, wherein said overflow passage means is in an annular space between an inner wall of said vaporization chamber which determines the normal liquid level of solution in said vaporization chamber and which is about the upper portion of said conical coils and another wall member of said vaporization chamber, there being means for directing concentrated solution from the lower part of said space to the upper part of said conical annular space about said preheater chamber.

17. Distillation apparatus, according to claim 15, wherein said overflow passage means is in the form of piping extending upwardly in said vaporization chamber adjacent the side wall thereof and which comprises means affording communication between said piping adjacent the lower end thereof and the upper part of the said annular space about said preheater chamber.

ROBERT V. KLEINSCHMIDT.